United States Patent
Rediger et al.

(10) Patent No.: US 11,885,503 B2
(45) Date of Patent: Jan. 30, 2024

(54) PRE-FABRICATED GREASE DUCT SYSTEM

(71) Applicant: Van-Packer Company, Buda, IL (US)

(72) Inventors: Robin Rediger, Buda, IL (US); Billy J. Sims, Tiskilwa, IL (US); Jason M. Kerner, Sheffield, IL (US)

(73) Assignee: Van-Packer Company, Buda, IL (US)

( * ) Notice: Subject to any disclaimer, the term of this patent is extended or adjusted under 35 U.S.C. 154(b) by 0 days.

(21) Appl. No.: 17/872,760

(22) Filed: Jul. 25, 2022

(65) Prior Publication Data

US 2022/0357050 A1    Nov. 10, 2022

Related U.S. Application Data

(63) Continuation of application No. 16/362,991, filed on Mar. 25, 2019, now Pat. No. 11,397,008.

(Continued)

(51) Int. Cl.
*F24C 15/20* (2006.01)
*A47J 37/06* (2006.01)
(Continued)

(52) U.S. Cl.
CPC .......... *F24C 15/20* (2013.01); *A47J 37/0664* (2013.01); *E04B 1/82* (2013.01); *F16L 9/18* (2013.01);
(Continued)

(58) Field of Classification Search
CPC ....... F24C 15/20; A47J 37/0664; F24F 13/02; F24F 13/0209; F24F 13/0281; E04B 1/82; F16L 9/21; F16L 9/18; F16F 13/24
(Continued)

(56) References Cited

U.S. PATENT DOCUMENTS

| 390,438 | A | * | 10/1888 | Bradbeer | F16L 37/084 |
|---|---|---|---|---|---|
| | | | | | 126/307 R |
| 1,158,855 | A | * | 11/1915 | Robinson | F16L 9/18 |
| | | | | | 138/148 |

(Continued)

FOREIGN PATENT DOCUMENTS

| CA | 2450977 C | * | 10/2007 | ............. F16L 23/14 |
| CA | 2791921 A1 | * | 4/2013 | ............... F16L 3/26 |

(Continued)

OTHER PUBLICATIONS

"IPSummaryTable-20230911.pdf", ProQuest Search, ip.com, Sep. 11, 2023. (Year: 2023).*

*Primary Examiner* — Steven B McAllister
*Assistant Examiner* — Daniel E. Namay
(74) *Attorney, Agent, or Firm* — K&L Gates LLP

(57) ABSTRACT

The present double walled grease duct includes a tubular outer shell surrounding a tubular inner liner, wherein a spacer is positioned perpendicular to the walls of the outer shell and the inner liner. The spacer can include a plurality of vertical metal strips extend from a top edge of the spacer to the bottom edge of the spacer, wherein the top edge of the spacer contacts the walls of the outer shell and wherein the bottom edge of the spacer contacts the walls of the inner liner. The metal strips resist the different rates of thermal expansion between the outer shell and inner liner ultimately preventing the collapse of the inner liner under pressure from thermal expansion.

13 Claims, 16 Drawing Sheets

Related U.S. Application Data

(60) Provisional application No. 62/647,983, filed on Mar. 26, 2018.

(51) Int. Cl.

| | |
|---|---|
| *F16L 9/21* | (2006.01) |
| *F16L 9/18* | (2006.01) |
| *F24F 13/24* | (2006.01) |
| *E04B 1/82* | (2006.01) |
| *F23L 17/02* | (2006.01) |
| *F24F 13/02* | (2006.01) |

(52) U.S. Cl.
CPC ................ *F16L 9/21* (2013.01); *F23L 17/02* (2013.01); *F24F 13/24* (2013.01); *F24F 13/0209* (2013.01); *F24F 13/0281* (2013.01)

(58) Field of Classification Search
USPC .............................. 126/299 E, 299 R; 454/44
See application file for complete search history.

(56) References Cited

U.S. PATENT DOCUMENTS

| | | | | |
|---|---|---|---|---|
| 2,627,430 A * | 2/1953 | Koffler | ................... | F16L 23/14 138/168 |
| 2,894,537 A * | 7/1959 | Carr | ....................... | F23J 13/025 138/143 |
| 3,092,529 A * | 6/1963 | Pearson | .............. | F24F 13/0281 138/DIG. 2 |
| 3,212,529 A * | 10/1965 | Ullman | ................... | F16L 9/003 138/145 |
| 3,251,382 A * | 5/1966 | Tatsch | ................. | F24F 13/0263 428/36.5 |
| 3,537,485 A * | 11/1970 | March | ...................... | F16L 9/18 138/117 |
| 3,918,354 A * | 11/1975 | Lambert | ................... | E04B 9/02 454/304 |
| 3,969,868 A * | 7/1976 | Bainter | .................. | B62D 29/04 428/167 |
| 5,918,644 A * | 7/1999 | Haack | ................. | F24F 13/0281 138/146 |
| 6,230,750 B1 * | 5/2001 | Lessard | ............... | F24F 13/0281 138/158 |
| 6,311,735 B1 * | 11/2001 | Small, Sr. | ................. | F16L 9/003 138/119 |
| 7,216,464 B2 * | 5/2007 | Neal | ........................ | A21B 1/24 110/336 |
| 9,074,788 B2 * | 7/2015 | Duffy | .................. | F24F 13/0263 |
| 9,557,071 B2 * | 1/2017 | Duffy | ..................... | F16L 59/14 |
| 10,024,569 B2 * | 7/2018 | Duffy | ..................... | F16L 57/04 |
| 10,365,005 B2 * | 7/2019 | Surraco | ..................... | B32B 9/02 |
| 10,578,335 B2 * | 3/2020 | Nolin | .................... | F16L 59/106 |
| 10,690,343 B2 * | 6/2020 | Hazard | ..................... | F23J 13/06 |
| 10,883,739 B2 * | 1/2021 | Gray | ...................... | B32B 5/022 |
| 10,888,809 B2 * | 1/2021 | Gunnefur | ........... | B01D 46/2411 |
| 11,397,008 B2 * | 7/2022 | Rediger | .................... | E04B 1/82 |
| 2001/0017165 A1 * | 8/2001 | Lessard | ............... | F24F 13/0263 138/158 |
| 2003/0236043 A1 * | 12/2003 | Calzavara | ........... | F24F 13/0263 138/140 |
| 2004/0069362 A1 * | 4/2004 | Lessard | ............... | F24F 13/0281 138/148 |
| 2007/0090647 A1 * | 4/2007 | Vincenti | ............. | F16B 15/0046 285/424 |
| 2007/0221195 A1 * | 9/2007 | Bibaud | .................... | F24C 15/20 126/80 |
| 2013/0174934 A1 * | 7/2013 | Duffy | ..................... | E04F 17/04 138/109 |
| 2013/0291990 A1 * | 11/2013 | Nagarajan | ................. | F16L 9/21 428/116 |
| 2013/0295303 A1 * | 11/2013 | Parks | ................... | F24F 13/0263 428/36.1 |
| 2014/0339815 A1 * | 11/2014 | Johnson | .................. | F16L 51/00 285/226 |
| 2015/0267937 A1 * | 9/2015 | Duffy | ..................... | E04F 17/04 138/109 |
| 2016/0025371 A1 * | 1/2016 | Parks | ........................ | B32B 3/12 138/149 |
| 2016/0084140 A1 * | 3/2016 | Dietz | .................... | D06M 11/79 427/372.2 |
| 2017/0130984 A1 * | 5/2017 | Duffy | ..................... | F16L 59/14 |
| 2019/0017723 A1 * | 1/2019 | Surraco | ..................... | B32B 3/10 |
| 2019/0154295 A1 * | 5/2019 | Duffy | ..................... | F16L 23/14 |
| 2019/0309981 A1 * | 10/2019 | Nolin | ..................... | F24F 13/0281 |
| 2020/0011564 A1 * | 1/2020 | Surraco | ................. | B32B 15/085 |

FOREIGN PATENT DOCUMENTS

| | | | | |
|---|---|---|---|---|
| CA | 2800362 A1 * | 7/2013 | ............. | E04F 17/04 |
| CN | 107345679 A * | 11/2017 | ............. | F24C 15/20 |
| DE | 102018115854 A1 * | 1/2020 | ............ | B22F 3/1055 |
| EP | 2578916 A1 * | 4/2013 | ................ | F16L 3/26 |
| FR | 2981141 A1 * | 4/2013 | ................ | F16L 3/26 |

* cited by examiner

PRE-FABRICATED GREASE DUCT SYSTEM

CROSS-REFERENCE TO RELATED APPLICATIONS

This application comprises a continuation application claiming priority to U.S. application Ser. No. 16/362,991 filed Mar. 25, 2019, which claims the benefit of priority to U.S. Provisional Application No. 62/647,983 filed Mar. 26, 2018, the entireties of which are hereby incorporated by reference.

BACKGROUND OF THE INVENTION

The present subject matter relates generally to air ventilation systems. More specifically, the present invention relates to a pre-fabricated grease duct system capable of removing grease laden air present in residential, industrial, and commercial kitchens.

Grease duct systems are used in industrial and commercial kitchens including food production plants, restaurants, and food courts. Grease duct systems generally include a cooking hood that is coupled to one or more air ducts. The cooking hood is generally installed over a cooking stove, deep fryer, etc. to ventilate smoke, heat, and gases created during the cooking and preparation of food away from the cooking area. As the hot air moves through the venting system, it begins to cool and layers of grease often build-up in the duct system. Without proper cleaning, these layers of accumulated grease can combust causing fires, smoke damage, etc. Accordingly, a properly installed and maintained grease duct system for commercial and industrial kitchens is often required by local laws and ordinances.

Current grease duct systems are either circular or rectangular and can be either single or double-walled. In a single walled system, the ventilation duct includes only one (layer or wall) duct to remove the grease laden air. In a double walled system, the ventilation duct includes an inner liner and an outer shell. The grease laden ventilated air travels through the inner liner, which is surrounded by an outer shell. An advantage of double walled systems is they can be zero-clearance systems, meaning that the outer shell can have zero clearance between itself and another combustible or even partially combustible surface, such as a wall or ceiling.

During operational failure (e.g., grease duct fire) of a double-walled system, the inner liner can often reach temperatures of 2000 degree Fahrenheit, while the outer shell can reach temperatures of 400 degrees Fahrenheit. The extreme temperature in the system creates a thermal expansion difference between the inner liner and outer shell, meaning that the metal comprising the inner liner and outer shell expand and contract at difference rates. This thermal expansion difference can lead to a build-up of stress in the inner liner, causing it to fail, potentially catastrophically (i.e., large scale fire, vent duct rupture, etc.).

Rectangular grease duct systems are commonly fabricated on-site by well-meaning but untrained or uninformed contractors, as a custom installation because each installation site has different dimensions, parameters, and requirements. On-site fabrication increases both the cost and time of installation. Additionally, on-site, one-off fabricated venting systems may not be manufactured as well as factory-built systems due to a lack of quality control oversight, human error, etc.

Accordingly, there is a need for a factory-built modular double-walled grease duct system that can withstand the thermal expansion difference between the inner liner and outer shell and also be installed on-site with no fabrication.

BRIEF SUMMARY OF THE INVENTION

To meet the needs described above and others, the present disclosure provides for a factory-built, pre-fabricated, double-walled grease duct system.

The present double walled grease duct includes a tubular outer shell surrounding a tubular inner liner, wherein a spacer is positioned perpendicular to the walls of the outer shell and the inner liner. The spacer can include a plurality of vertical metal strips extend from a top edge of the spacer to the bottom edge of the spacer, wherein the top edge of the spacer contacts the walls of the outer shell and wherein the bottom edge of the spacer contacts the walls of the inner liner. The metal strips resist the different rates of thermal expansion between the outer shell and inner liner ultimately preventing the collapse of the inner liner under pressure from thermal expansion.

The pre-fabricated grease duct system can be a double walled grease duct system that includes one or more pre-fabricated sectional double walled grease duct fittings. The sectional grease duct fittings may be one of various types including, but not limited to: straight section, 45-degree tee, reduced 45-degree tee, 90-degree tee, reduced 90-degree tee, 90-degree elbow, 90-degree wye, end cap, and fan hood transition. These various types of grease duct fittings (and others) may be needed during the installation of the grease duct system due to the construction variations present in each installation location. For example, 90-degree elbows may be needed to go around walls and/or columns while a 90-degree wye may be used to connect two separate grease ducts to a singular grease duct exhaust port.

The pre-fabricated double layer grease duct section can include an inner liner, an outer shell, a spacer, a flange, and high temperature insulation. The inner liner, outer shell, spacer, and flange may be manufactured from any metal or other material that can withstand the high temperatures generated by the ignition or combustion of grease in an improperly maintained grease duct system. Particularly preferred metals include stainless steel, aluminized steel, and galvanized steel.

The spacer can be located in the annular space between the inner liner and the outer shell. The spacer can include perforations that allow for the independent expansion and contraction of the inner liner and outer shell, while also maintaining the dimensions of the annular space. Before being placed into the outer shell, the inner liner can be wrapped in thick layers of ceramic fiber insulation. The insulation limits the amount of heat transferred between the inner liner and outer shell. The insulation combined with the spacers may also allow the grease duct system to have a zero-clearance rating.

The spacer may include perforations that create metal strips between each of the perforations, wherein the metal strips connect a top edge of the spacer to a bottom edge of the spacer, wherein the top edge of the spacer contacts the outer shell and the bottom edge contacts the inner liner. The metal strips reduce the amount of heat transfer between the inner liner and outer shell, while also allowing the insulation to absorb heat away from the inner liner. Additionally, the metal strips have limited resistive strength, and therefore, can resist the different rates of thermal expansion between the inner liner and outer shell. Without the narrow metal strips, the thermal expansion difference can cause a significant build-up of stress in the duct, which can lead to a failure of the grease duct system, including fatigue, fracture, and/or rupture of the weld joints which hold the duct system together, or even structural failure due to the liner nearing the melting point of the steel.

An object of the present invention is to provide a prefabricated factory-built double walled grease duct system. Such a system simplifies the installation process, therefore lowering the time and cost of installation.

An advantage of the invention is that it can be factory built, thus reducing the risks associated with on-site fabrication, including mistakes in welding which can lead to leakage from the system, etc. Most modern factories are capable of tight quality control standards and even automated inspections of welds, etc. which are difficult if not impossible when a vent duct system is installed on site. Further, fabrication of the duct system in a factory prevents or greatly reduces the need for skill laborers to install a grease duct venting system onsite.

Another advantage of the invention is that it provides for independent expansion and contraction of the inner liner and outer shell, while also maintaining the dimensions of the annular space. The independent expansion and contraction reduces the risk of failure of the system.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1:
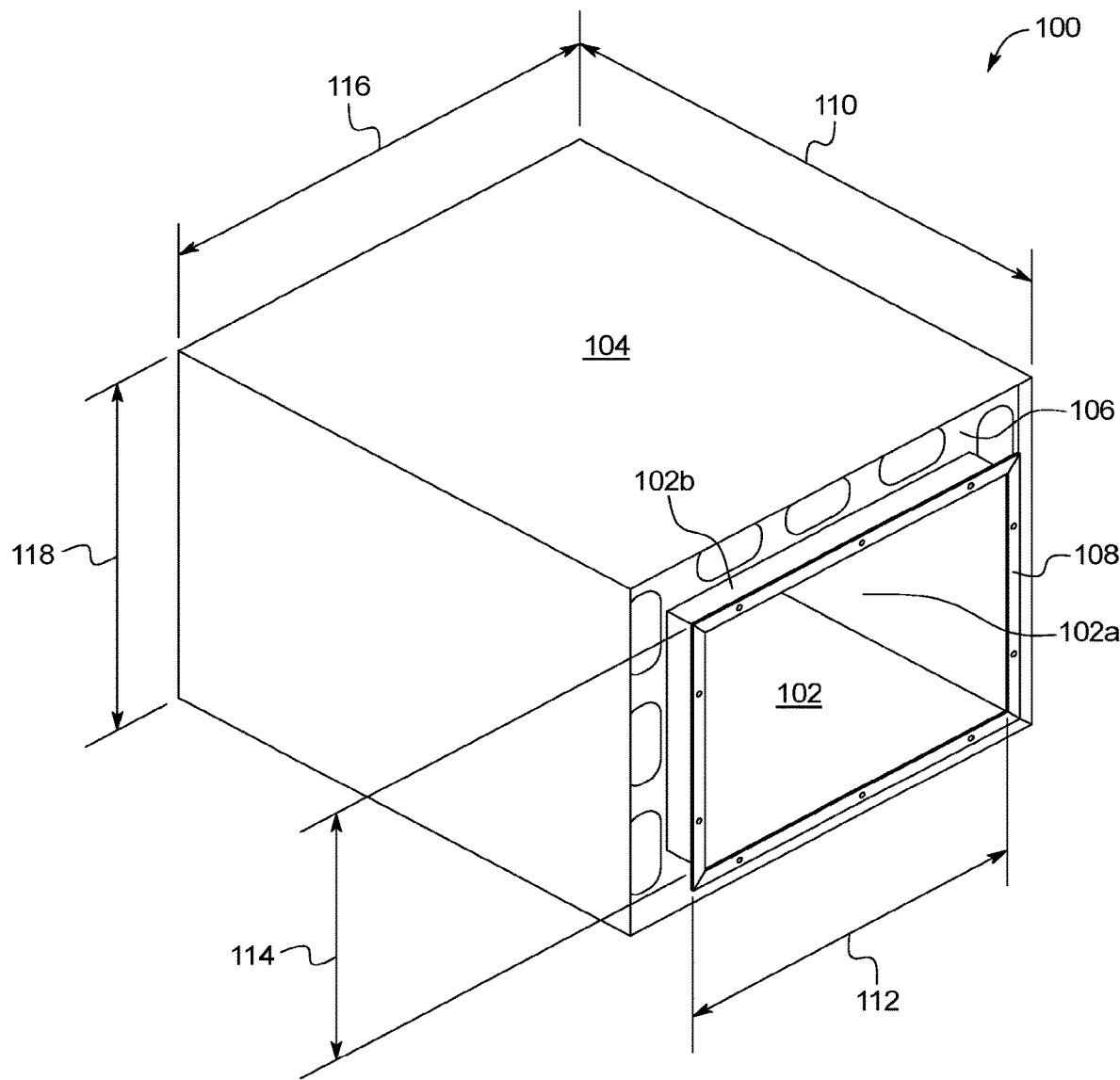
FIG. 1 is a perspective view of an example of the double walled straight rectangular grease duct section.

FIG. 1 illustrates an example of a manufactured double walled straight rectangular grease duct 100. As shown in FIG. 1, the straight grease duct 100 includes an inner liner 102, an outer shell 104, a spacer 106, and a flange 108. The inner liner 102 includes an inner end 102c (see FIG. 3) extends out past an outer end 104a (see FIG. 3) of the outer shell 104, which allows room for the installer's hands to work during field assembly. For example, the inner liner 102 can be composed of an internal portion 102a that can be completely encompassed by the outer shell 104, and an external portion of an external inner liner 102b that can protrude out from the outer shell 104.

The straight grease duct 100 can have a section length 110, wherein the section length 110 can be between and including 10-80 inches, e.g., 18 inches, 30 inches, 42 inches, or 60 inches, or any suitable length.

The inner liner 102 can have an inside width 112 and an inside height 114. In an example, the inside width 112 and inside height 114 can have a minimum length of 4 inches, a maximum length of 48 inches, and a maximum interior cross-section area of 1300 square inches (e.g., 1296 square inches). Further, in an example, the inner liner 102 can have a maximum inside width 112 to inside height 114 ratio of 6:1.

The liner extender 102b extends beyond the outer shell and can have a length between, and including, 0.5 inches to 10 inches, for example, 1 inch, 3 inches, 5 inches, 6 inches, among others.

The outer shell 104 can have an outside width 116 and an outside height 118. The outside width 116 and outside height 118 can be greater than the inside width 112 and inside height 114, respectively. In an example, the length of the outer shell 104 can be 6 to 8 inches longer than the length of the inner liner 102. The size difference between the dimensions of the inner liner 102 and outer shell 104 results in an annular space between the inner liner 102 and outer shell 104.

The spacer 106 lies perpendicular between the inner liner 102 and outer shell 104 and sits flush with the edge of the outer shell 104 and the inner liner 102 can extend past the spacer 106.

The inner liner 102, outer shell 104, spacer 106, and flange 108 can individually be made of any suitable material. In an example, the inner liner 102, outer shell 104, spacer 106, and flange 108 include metals that have a metal gauge value that can withstand the high temperatures generated by the possible ignition and combustion of built up layers of grease within the inner liner 102 of an improperly maintained grease duct.

The inner liner 102 can be constructed of stainless steel with a minimum gauge value of 20 and/or mild carbon steel with a minimum gauge value of 16. In an example, the outer shell 104 can include an outside width 116 and outside height 118 of less than or equal to 36 inches, wherein the outer shell 104 can be constructed 24-gauge aluminized steel, galvanized steel, or stainless steel. The outer shell 104 with an outside width 116 or outside height 118 greater than 36 inches can be constructed of at least 20-gauge aluminized steel, galvanized steel, or stainless steel.

The spacer 106 can be constructed from 20-gauge to 18-gauge stainless steel. The flange 108 can be constructed from at least 11 gauge mild steel, aluminized steel, galvanized steel, or stainless steel.

Figure 3:
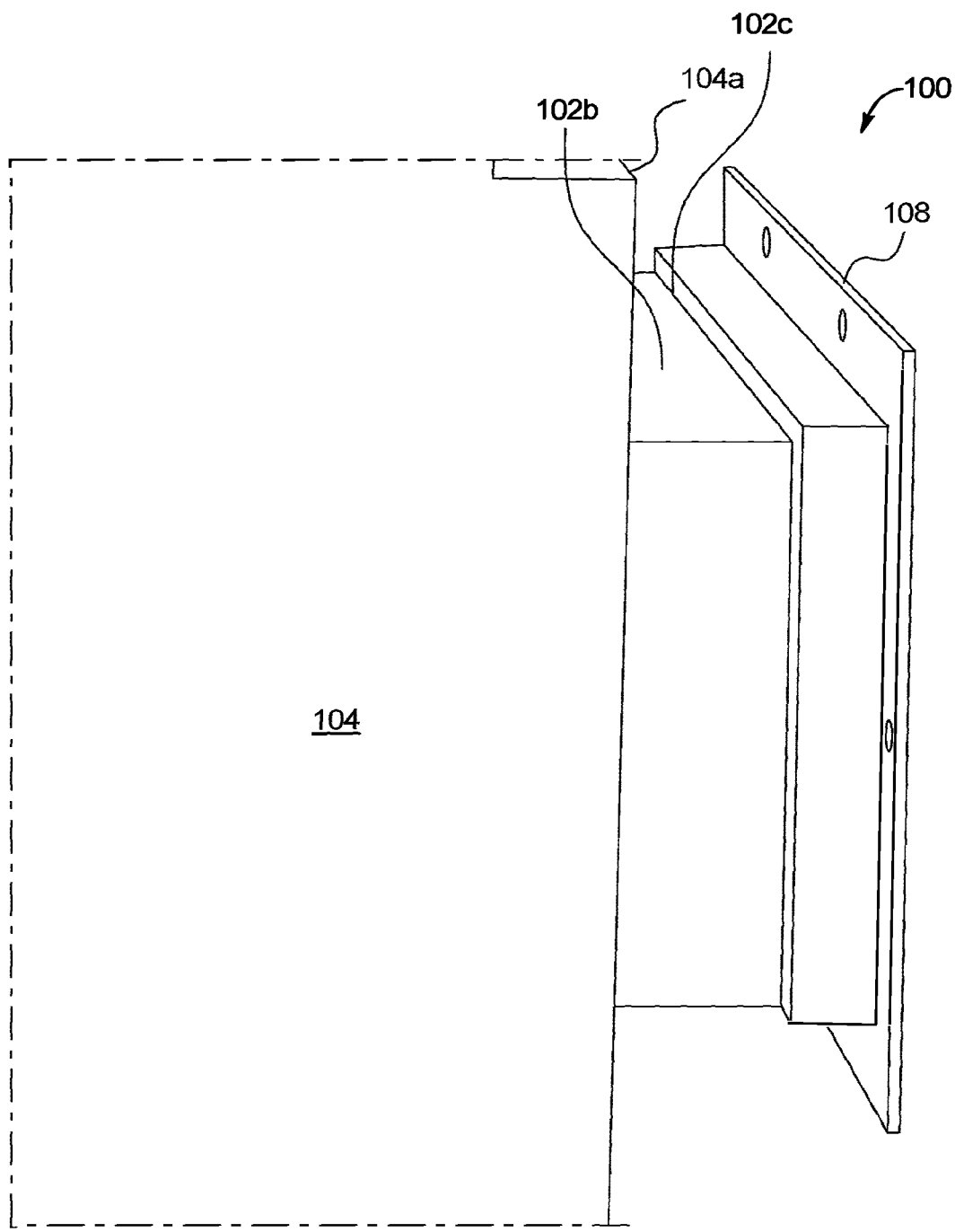
FIG. 3 is a side view of an example of the double walled rectangular grease duct section.

FIG. 3 illustrates an example wherein the external inner liner 102b protrudes out of the outer shell 104. As seen in the figure, the flange 108 is MIG welded to the end of the external inner liner 102b. However, MIG welding is only one of any number of welding methods by which the flange 108 can be attached to external inner liner 102b.

Figure 2:
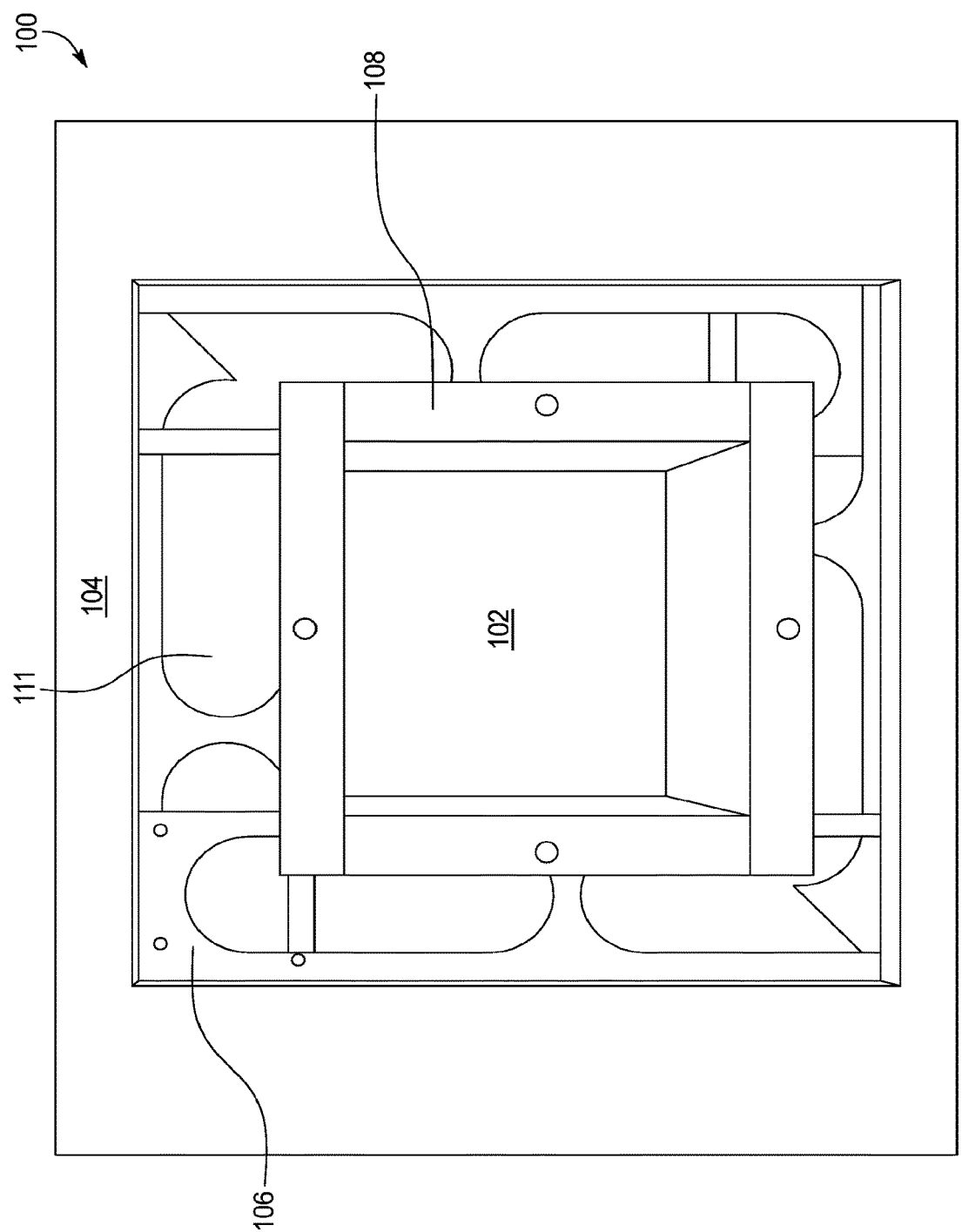
FIG. 2 is a front elevational view of an example of the double walled rectangular Reduced 90 degree Tee grease duct section.

As shown in FIG. 2, the annular space between the inner liner and outer shell is filled with thick layers of ceramic fiber insulation 111 (e.g., high-temperature ceramic fiber insulation). The ceramic fiber insulation 111 can be alkaline earth silicate fiber insulation and can have a density of 10 pounds per cubic foot. However, the density of the insulation can vary depending on the use requirements for a given venting system installation. For example, a range of densities between 8-12 pounds is contemplated, with different insulation densities potentially being used within different portions of a given venting system installation to save on costs, aid in weight balancing, etc.

In an example, the annular space is filled with insulation 111 to wrap the inner liner 102, for example, in multiple (e.g., 3) layers, of nominal 1-inch thick insulation within the entire annular space before placing the outer shell 104 over the inner liner 102. For example, the annular space between the inner liner 102 and outer shell 104 is 3 or 4-inches, the inner liner 102 should be wrapped with three 1-inch layers of insulation 111. The annular space can be either 3 inches or 4 inches wide. In an example, 3 wraps of 1" nominal thickness ceramic fiber insulation is used.

Figure 4:
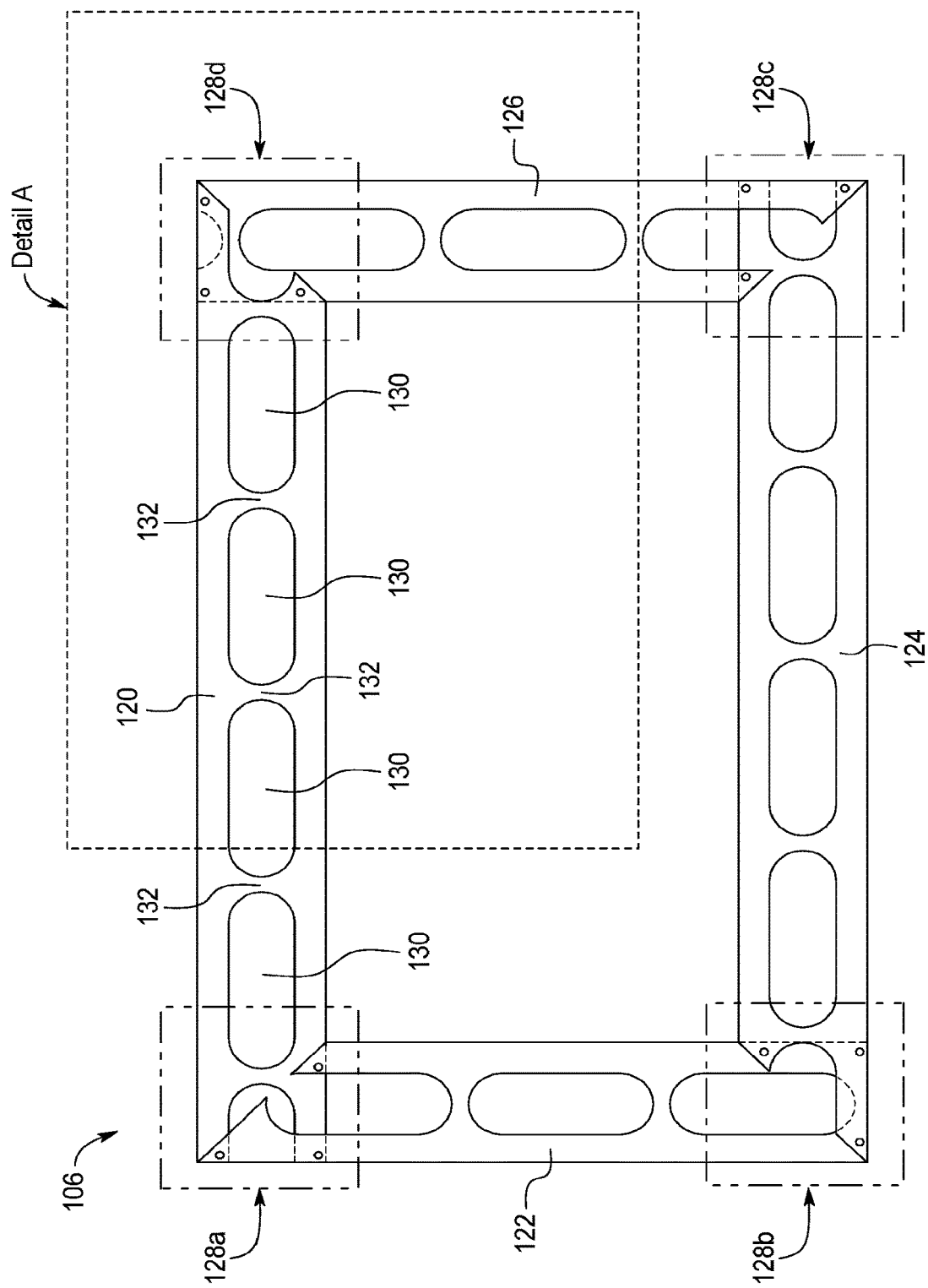
FIG. 4 is a front elevation view of an example spacer disclosed herein.

FIG. 4 illustrates an example of the spacer 106. As seen in FIG. 4, the spacer 106 includes sides 120, 122, 124, and 126. The spacer 106 also includes one or more perforations 130. The perforations are voids and/or openings within the planar body of the spacer. The perforations may be one of many shapes, including, but not limited to ovals, circles squares, rectangles, pentagons, and/or hexagons.

As shown in FIG. 4, the perforations 130 create vertical metal strips 132 between the perforations 130. The metal strips 132 traverse between the two edges of the spacer. In an example, one perforation is between two metal strips. The metal strips 130 act as a heat sink by reducing the amount of heat transferred between the inner liner 102 and out shell 104. During operation of the grease duct system, the metal of the inner liner 102 can reach extreme temperatures (approximately 2000 degrees Fahrenheit). The metal of the outer shell 104, while not as hot as the inner liner 102, can also reach high temperatures (approximately 400 degrees Fahrenheit). Therefore, in order to prevent failure (e.g., a fire), the present device reduces the amount of heat transfer between the inner liner 102 and outer shell 104. The metal strips 132 can be narrow in width to allow the insulation 111 to absorb the heat away from the metal. For example, the perforations can be filled at least partially with insulation. The width of the metal strips 132 can be between, and including, 0.1 inches to 3 inches, 0.5 inch to 2 inches, 0.5 inch to 1 inch, among others.

Additionally, the narrow metal strips 132 can have limited resistive strength to resist the different rates of thermal expansion between the inner liner 102 and outer shell 104. As previously discussed, both the inner liner 102 and outer shell 104 can reach high temperatures during operation. However, the inner liner 102 has a higher rate of thermal expansion than the outer shell 104 because the inner liner 102 reaches temperatures higher than the outer shell 104.

The metal strips 132 resist the difference rates of thermal expansion between the inner liner 102 and outer shell 104 by functioning as expansion joints.

If the inner liner 102 was rigidly attached to the outer shell 104 with a spacer 106 that did not include perforations 130, the inner liner 102 may collapse during operation due to the thermal expansion difference between the inner liner 102 and outer shell 104. For example, the thermal expansion difference may be so great that it applies too much pressure on the inner liner 102, weakening the inner liner 102, and causing the inner liner 102 to collapse on itself, possibly leading to a fire. However, with inclusion of perforations 130, the metal strips 132 can resist the different rates of thermal expansion and prevent the inner liner 102 from collapsing.

Figure 5:
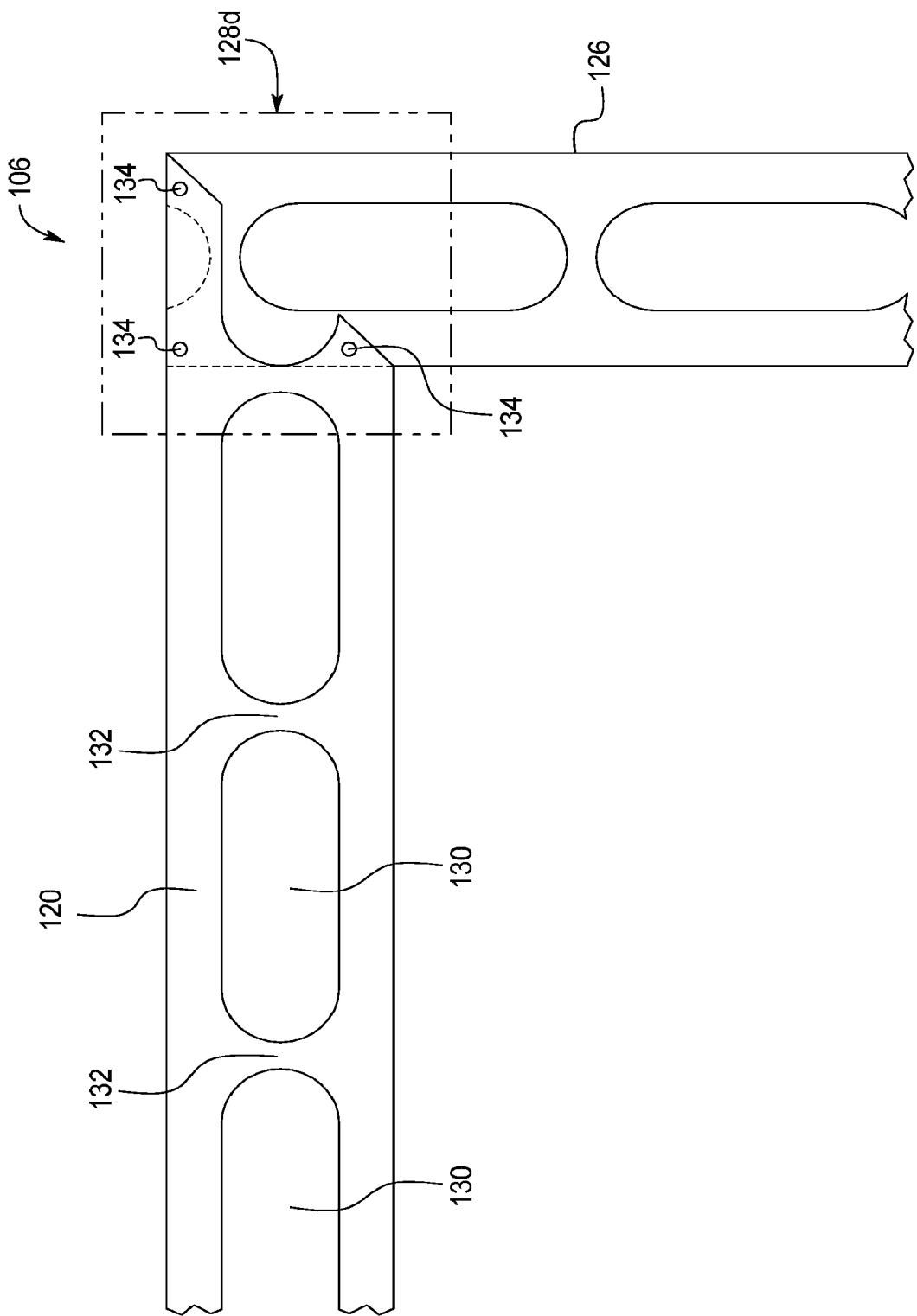
FIG. 5 is an enlarged view of an example of a corner of the spacer disclosed herein.

Spacer 106 also includes overlap areas 128a, 128b, 128c, and 128d are areas where one side of the spacer overlaps another perpendicular side of the spacer 106. For example, as seen in FIG. 4, in overlap area 128d, side 126 overlaps side 120. The overlap areas may also include one or more spot-weld locations 134, which is where the spacer 106 is welded to the inner liner 102, as shown in FIG. 5. The spacer 106 may be resistance welded into place between the inner liner 102 and outer shell 104. Although other welding methods can be used.

Figure 6:
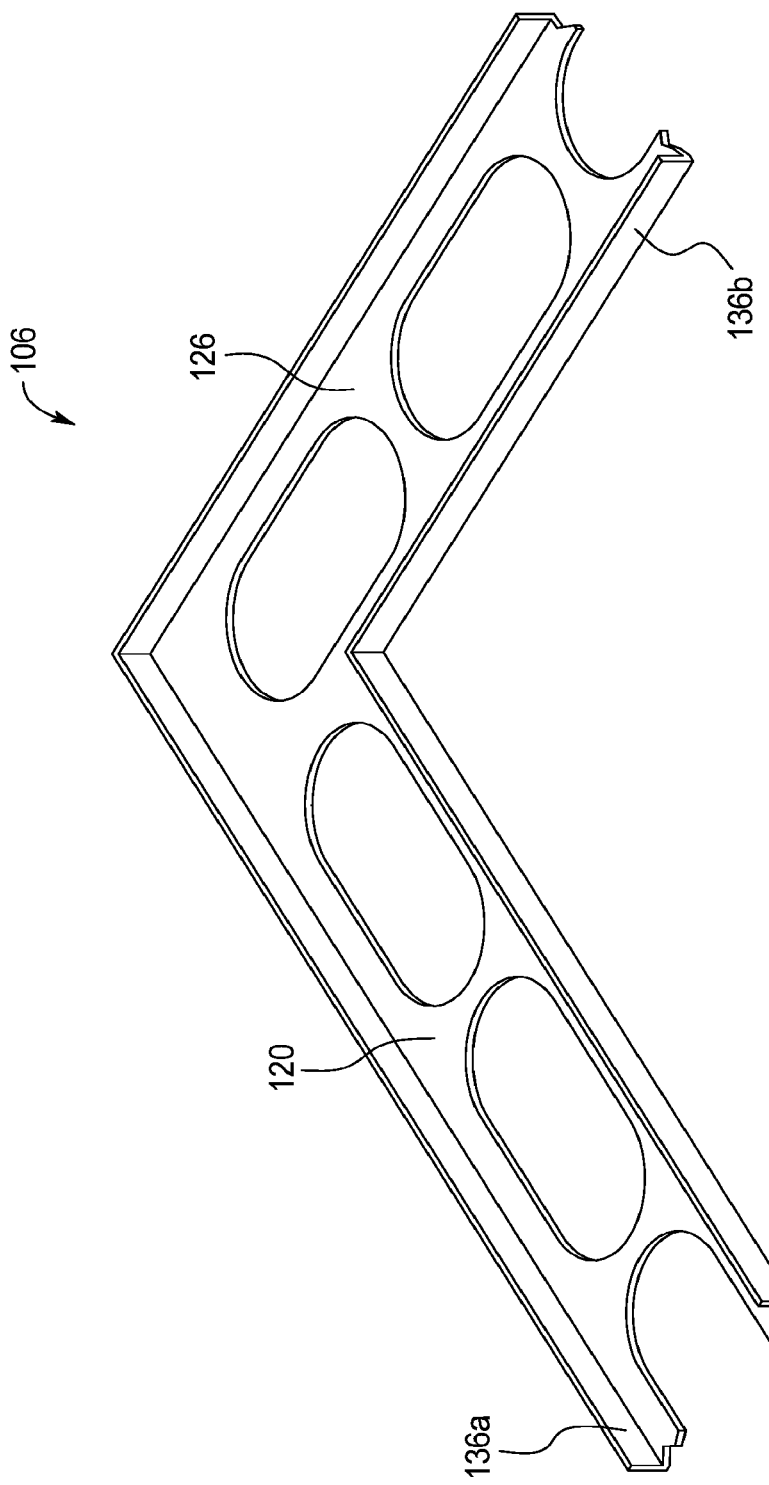
FIG. 6 is the backside view of an example of a corner of the spacer disclosed herein.

FIG. 6 illustrates the backside of the spacer 106 shown in FIGS. 2 and 4. The backside of the spacer 106 includes roll formed flange 136a and overhang 136b. The roll formed flanges 136a and overhang 136b allow the spacer 106 to have a tighter fit when installed and attached to the inner liner 102. The roll formed flange also provides a flat area to weld.

Figure 7:
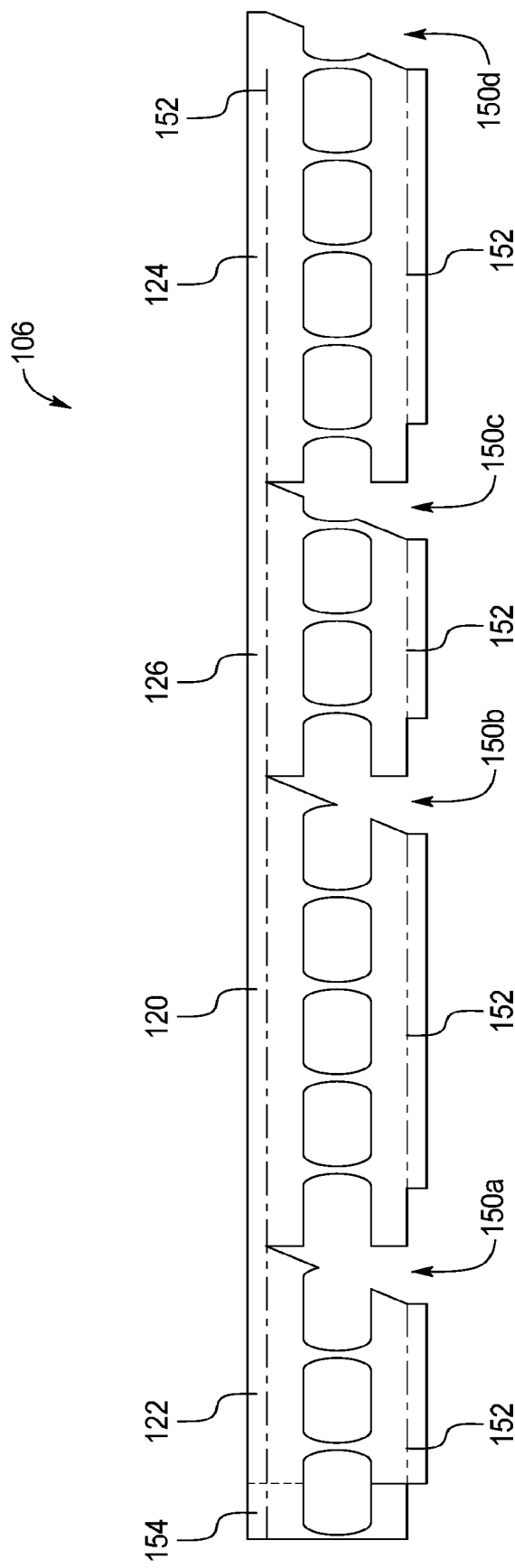
FIG. 7 is a flat pattern view of an example of the spacer disclosed herein.

FIG. 7 illustrates the spacer 106 as it would look if it were laid out at 180 degrees on a flat surface. The spacer 106 can include notches 150a, 150b, and 150c, and 150d, bend lines 152, and overlap areas 154. Each side of the spacer can be folded along the notch to create the rectangular spacer 104 illustrated in FIG. 4. For example, side 122 can be folded along notch 150a such that it is perpendicular to side 120. The notches may be cut at between, and including, 30 degrees to 55 degrees, for example, 45 degrees.

As seen in FIG. 7, the spacer 106 may also include bend lines 152. The bend lines 152 allow the sides of the spacer 106 to be bent so as to create the overhangs 136a and 136b seen in FIG. 6.

Figure 8:
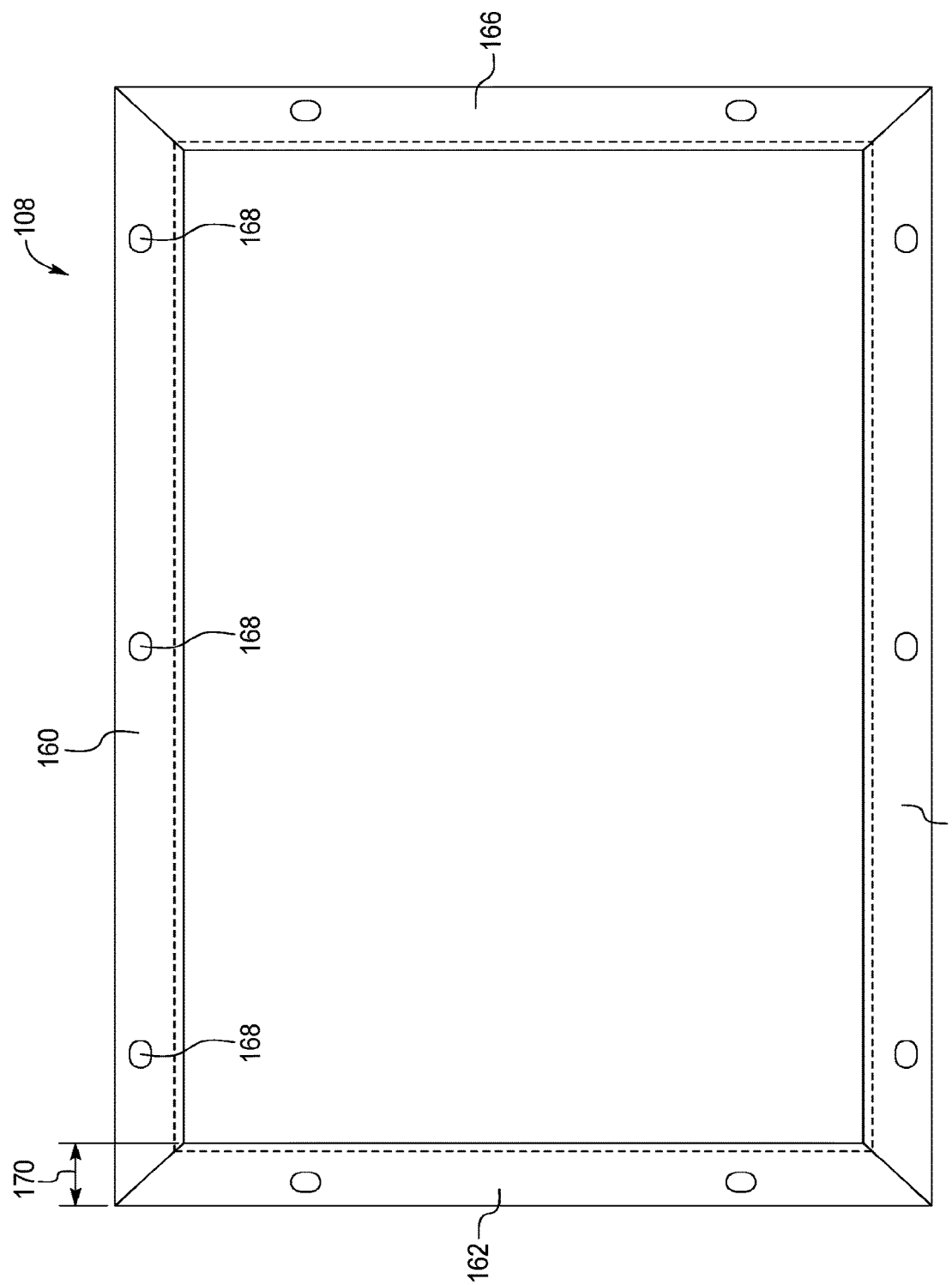
FIG. 8 is a front elevational view of an example flange disclosed herein.

FIG. 8 is an example of the mating side of the flange 108 shown in FIGS. 1 and 2. The mating side of the flange 108 is capable of being attached to the mating face of a second grease duct. As seen in FIG. 8, the flange 108 includes sides 160, 162, 164, and 166 and slotted bolt holes 168. The flange 108 has a width 170. The width 170 can be between, and including, 0.5 inch to 4 inches, 0.5 inch to 2 inches, 0.5 to 1.5 inches, for example, 1 inch.

During installation of the flange 108, fasteners are inserted into the bolt holes 168 to attach the flange 108 to the flange of another grease duct fitting or component. It is preferred that the bolts holes be spaced no more than 6-inches apart. The mating face of the flange 108 is flush with the front-end of the inner liner.

Upon installation, a rectangular flange can be capable of being rotated 180 degrees and match the mating flange of an adjoining rectangular grease duct and that a square flange be capable being rotated 90 degrees and match the mating flange of an adjoining square grease duct.

Figure 9:
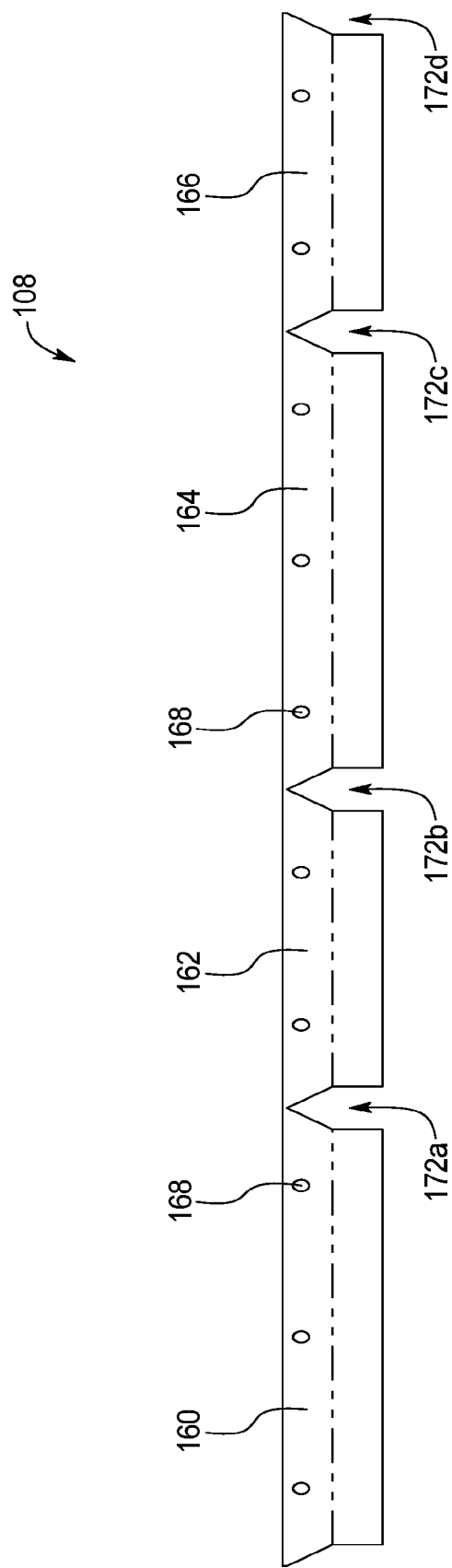
FIG. 9 is a flat pattern view of an example of the flange disclosed herein.
Figure 10:
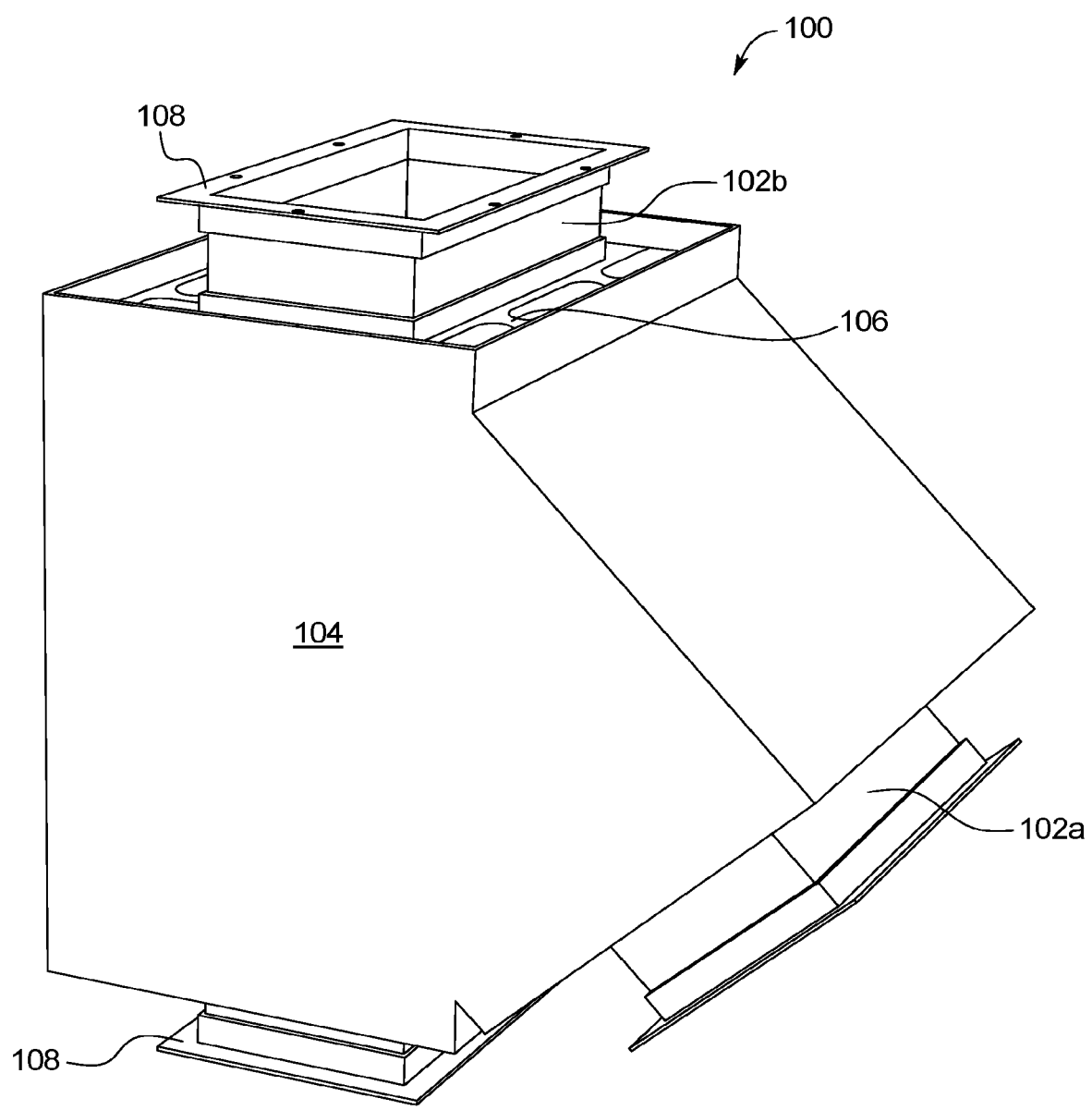
FIG. 10 is a perspective view of an example of a 45-degree tee grease duct.

FIG. 9 illustrates the flange 108 as it would look if it were laid out at 180 degrees on a flat surface. The flange can be folded into four sides 160, 162, 164, and 168. Similar to spacer 106, flange 108 includes notches 172a, 172b, 172c, and 172d. Each side of the flange 108 can fold along its corresponding notch to create a rectangle. For example, side 160 can fold along notch 172a so that side 160 is perpendicular to side 162.

Figure 11:
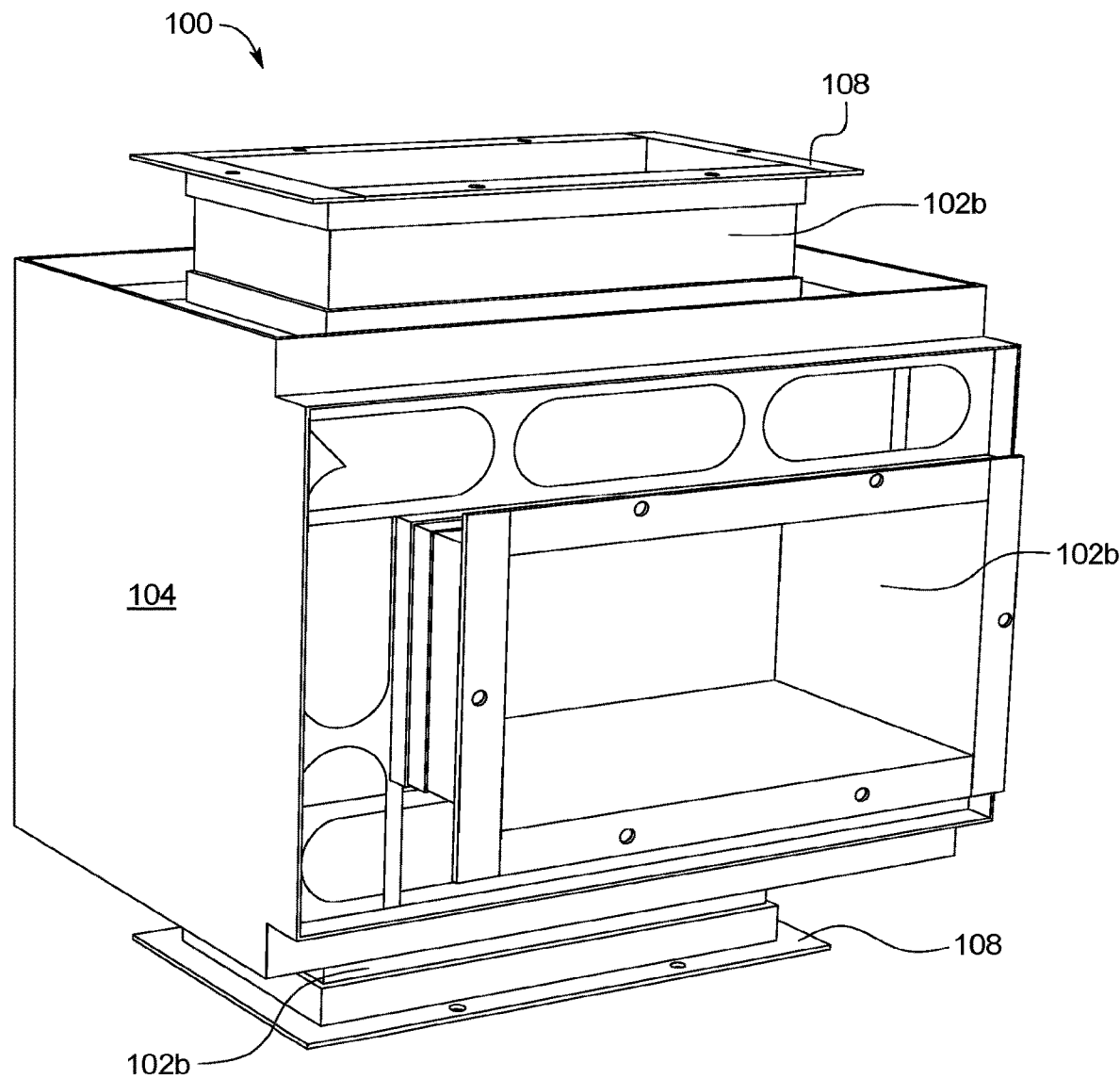
FIG. 11 is a perspective view of an example of a 90-degree tee grease duct.
Figure 12:
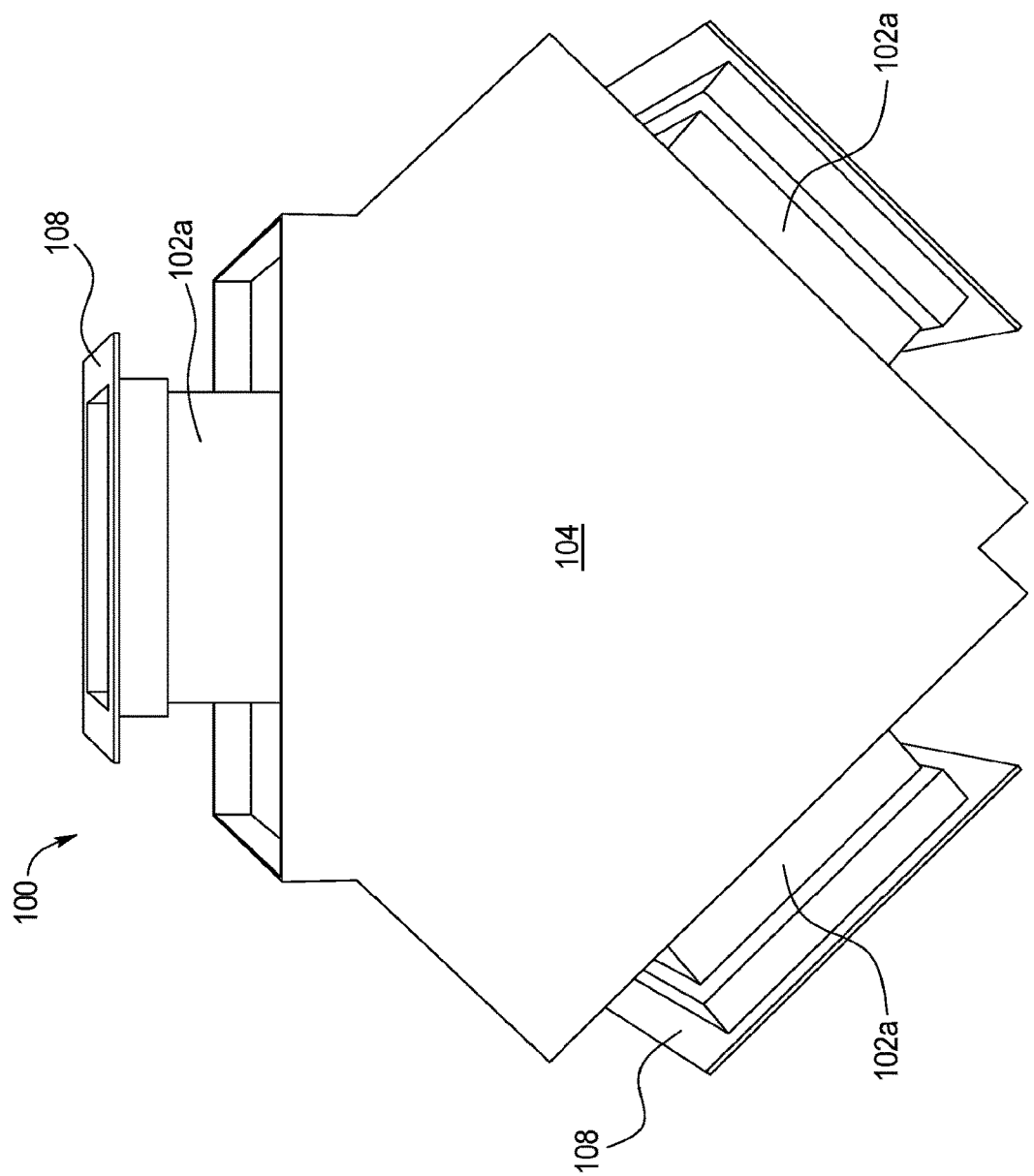
FIG. 12 is a perspective view of an example of a 90-degree wye grease duct.
Figure 13:
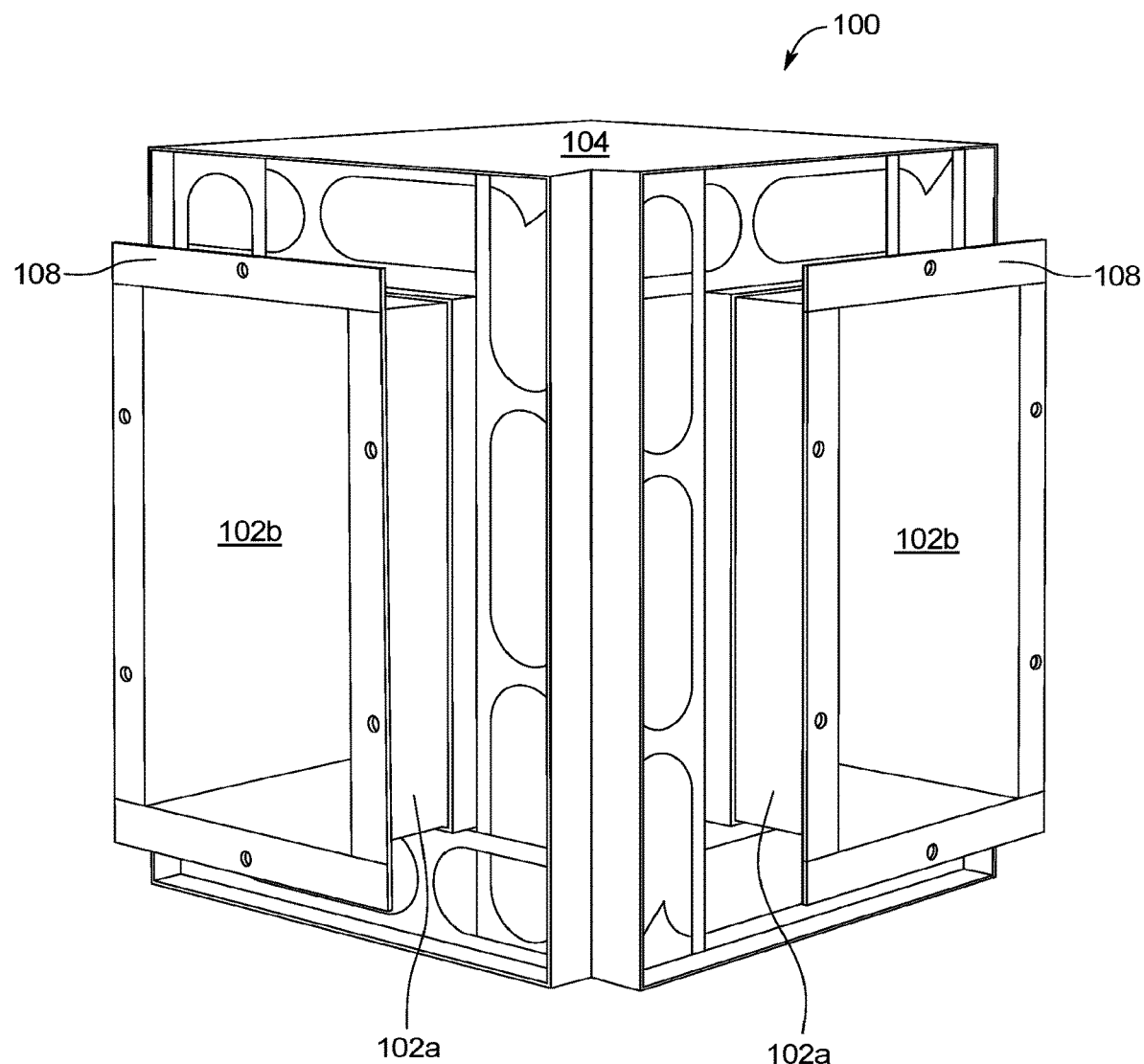
FIG. 13 is a perspective view of an example of a 90-degree wye grease duct.

The present device can be any suitable shape and configuration. For example, various types of ducts are generally used for construction purposes, including maneuvering around walls and going through ceilings, as shown in FIGS. 10-13. For example, in order to connect a horizontal portion of the grease duct system to a vertical portion of the grease duct system, a one or more 90-degree tee, as shown in FIG. 11 may be used. As shown in FIG. 12-13, the device can include more than one elbows.

Figure 14A:
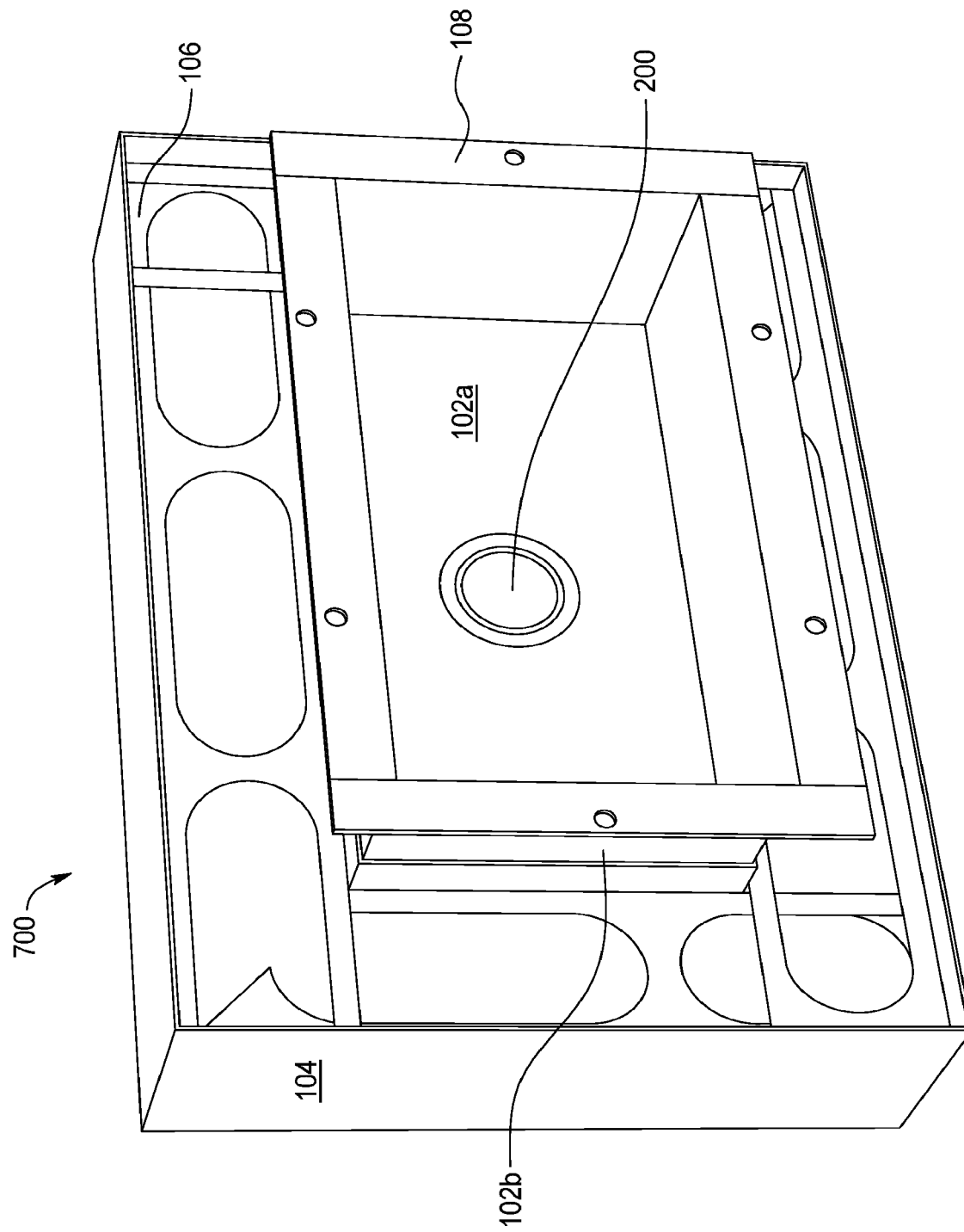
FIGS. 14a-14b are perspective views of examples of an end-cap for a double walled grease duct.
Figure 14B:
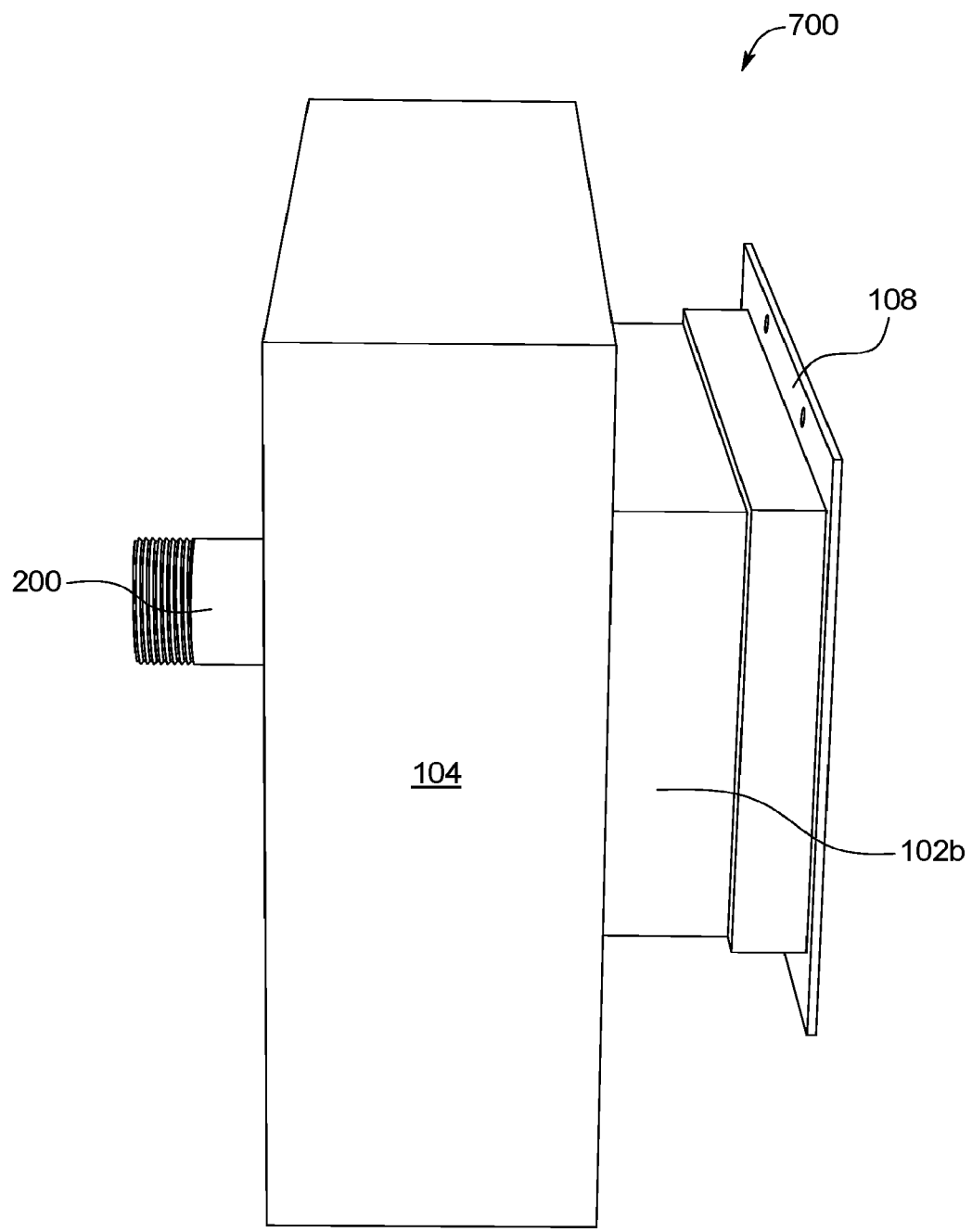
Figure 15:
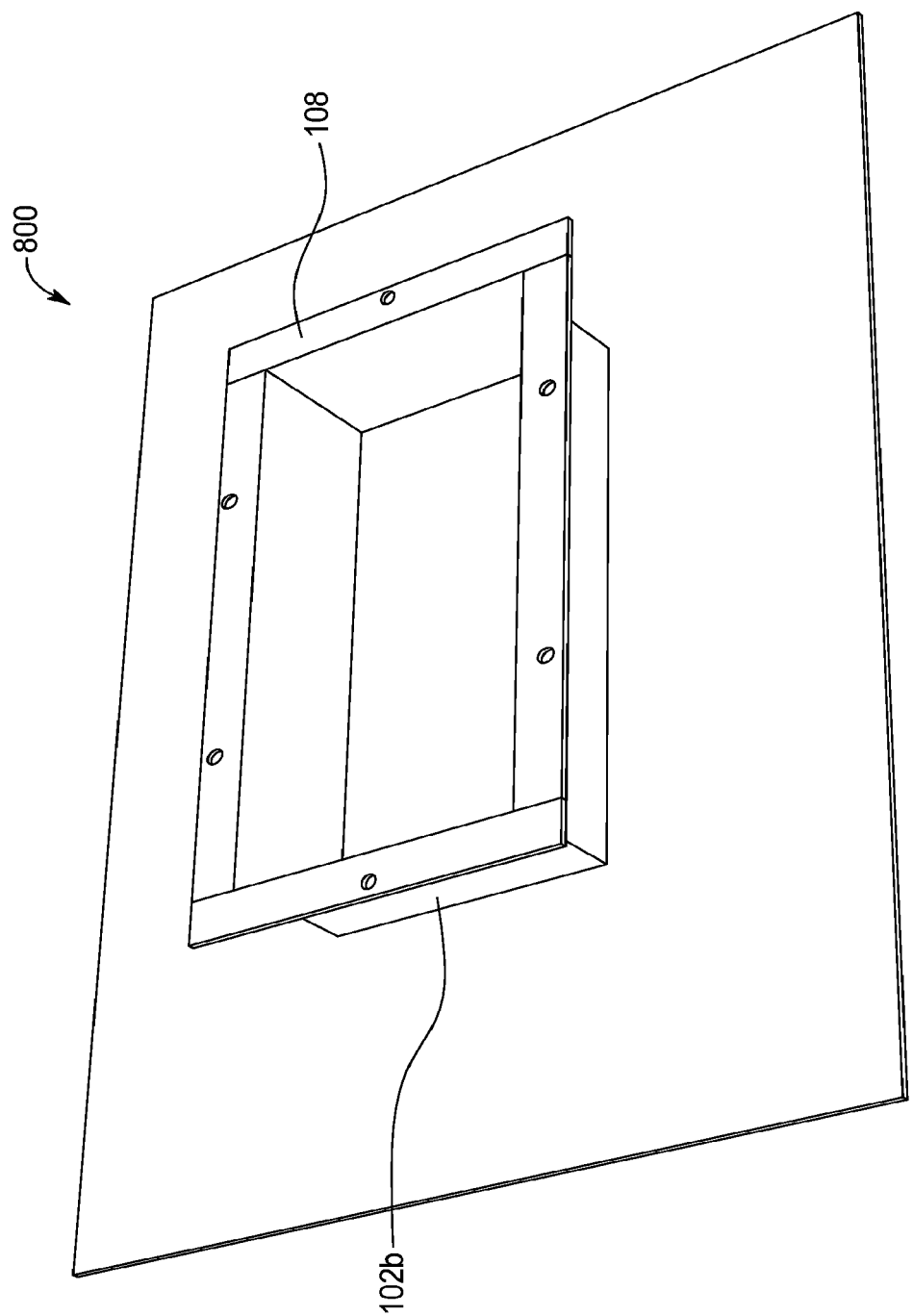
FIG. 15 is a perspective view of a fan adaptor.

FIGS. 14a to 14b illustrate a grease duct end cap 700 that can be installed on any of the grease duct sections previously presented. The end cap includes a drain pipe 200 that is used to discharge grease out of the ducts into a reservoir. FIG. 15 illustrates a fan hood transition section of a grease duct system. The fan hood transition section 800 is connected, via the flange, to a fan hood used to exhaust the grease laden air present in the kitchen cooking area, out to the atmosphere.

The various duct sections can be joined together via the flange 108. In one example, two duct sections can be bonded together by bolting together each flange 108 via the bolts holes 168. Prior to bolting together each flange, a sealant may be placed on each flange. After joining the sections, the space between the two separate sections (e.g., field joint) may be filled with insulation and then surrounded by one or more draw bands that completely enclose the field joint between the two grease duct sections.

It should be noted that various changes and modifications to the presently preferred embodiments described herein will be apparent to those skilled in the art. Such changes and modifications may be made without departing from the spirit and scope of the present invention and without diminishing its attendant advantages.

The invention claimed is:

1. A double walled grease duct comprising:
an outer shell including an outer tubular body having an outer first end and an outer second end;
an inner liner including an inner tubular body having an inner first end and an inner second end, wherein the inner liner has a cross-sectional area less than a cross-sectional area of the outer liner, wherein at least a portion of the inner liner is positioned within the outer shell; and
a spacer rigidly attaching the outer shell to the inner liner, the spacer including a planar body including an outer spacer edge and an inner spacer edge, each edge spanning between a first spacer end and a second spacer end of the planar body, wherein the outer edge contacts the outer shell, wherein the inner edge contacts the inner liner,
wherein the spacer includes a plurality of metal strips surrounding a plurality of perforations, and
wherein at least one line drawn along the planar body from the first spacer end to the second spacer end and parallel to each of the inner spacer edge and the outer spacer edge passes along lengths of metal along the plurality of metal strips and lengths of voids along the plurality of perforations, wherein a cumulative length of metal along which the at least one line passes is less than a cumulative length of voids along which the at least one line passes.

2. The double walled grease duct of claim 1, wherein the perforations are filled with insulation.

3. The double walled grease duct of claim 1, wherein the planar body of the spacer includes notches in the inner spacer edge, wherein the notches are notch voids in the inner spacer edge, wherein when the spacer is bent around the outer surface of the inner tubular body, a first portion of the planar body overlaps a second portion of the planar body.

4. The double walled grease duct of claim 1, wherein the inner liner has a higher rate of thermal expansion than the outer shell.

5. The double walled grease duct of claim 1, wherein the metal strips have a width between, and including, 0.5 inch to 1 inch.

6. The double walled grease duct of claim 1, wherein the space between the outer tubular body and the inner tubular body is at least partially filled with ceramic fiber insulation.

7. The double walled grease duct of claim 1, wherein the inner first end of the inner liner extends outside of the outer first end, and wherein the inner second end of the inner liner extends outside of the outer second end.

8. The double walled grease duct of claim 1, further comprising a flange outwardly extending from a perimeter of the inner first end, the inner second end, or combinations thereof.

9. The double walled grease duct of claim 8, wherein the width of the flange is between, and including, 0.5 inch to 1.5 inches.

10. The double walled grease duct of claim 8, wherein the flange is connected to a second grease duct.

11. The double walled grease duct of claim 1, wherein each metal strip has a width between adjacent perforations of between about 0.1 inches and 3 inches.

12. The double walled grease duct of claim 11, wherein each metal strip has a width between adjacent perforations of between about 0.5 inches and 2 inches.

13. The double walled grease duct of claim 12, wherein each metal strip has a width between adjacent perforations of between about 0.5 inches and 1 inches.

* * * * *